Aug. 21, 1934. J. H. THORNLEY Re. 19,284
MECHANICAL DIGGING APPARATUS
Original Filed Nov. 13, 1929 4 Sheets-Sheet 1
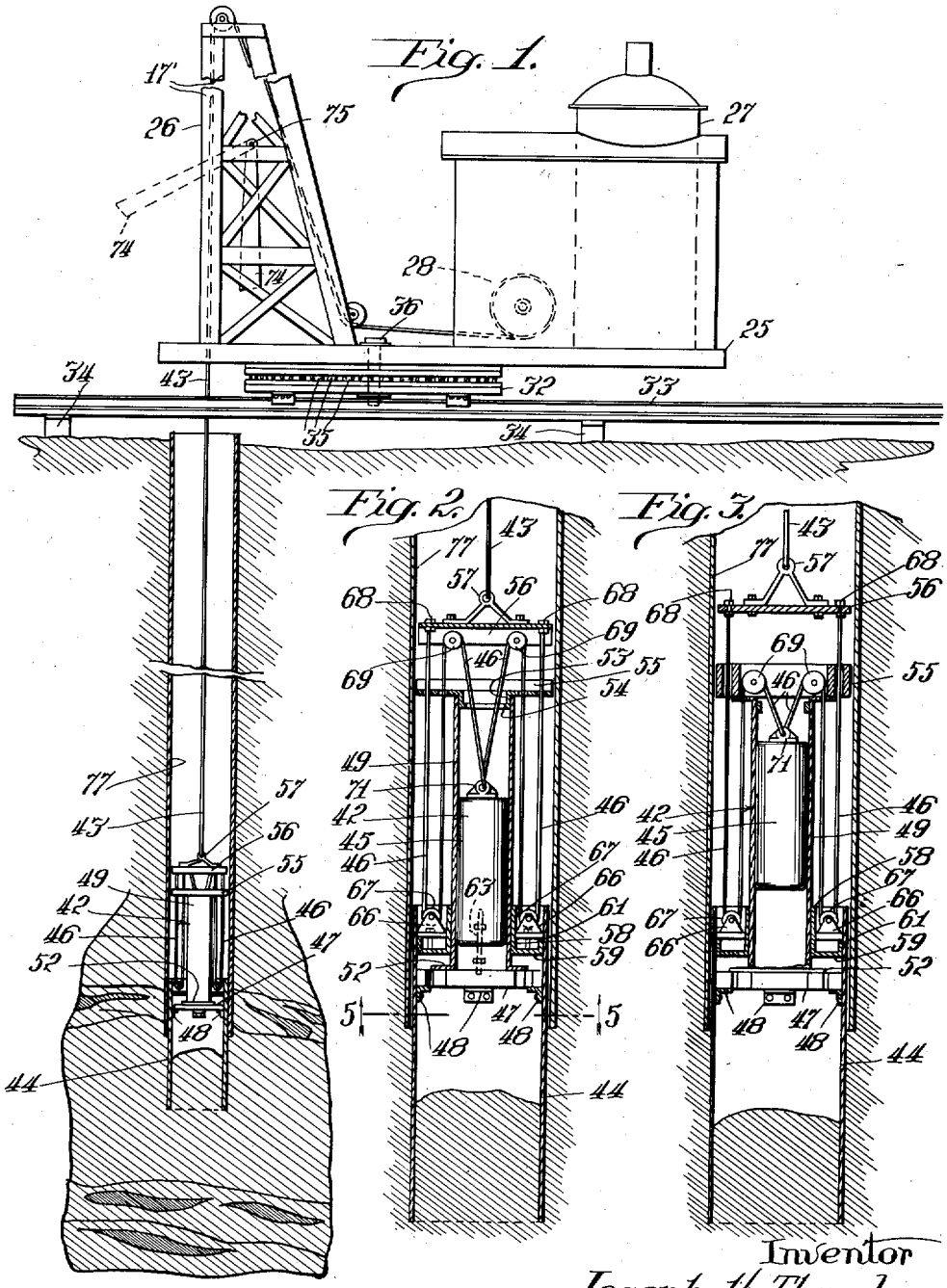
Inventor
Joseph H. Thornley
By Brown, Jackson, Boettcher & Dienner
Attorneys Aug. 21, 1934. J. H. THORNLEY Re. 19,284

MECHANICAL DIGGING APPARATUS

Original Filed Nov. 13, 1929 4 Sheets-Sheet 2

Inventor
Joseph H. Thornley
By Brown, Jackson, Boettcher & Dienner
Attorneys

Aug. 21, 1934. J. H. THORNLEY Re. 19,284
MECHANICAL DIGGING APPARATUS
Original Filed Nov. 13, 1929 4 Sheets-Sheet 3
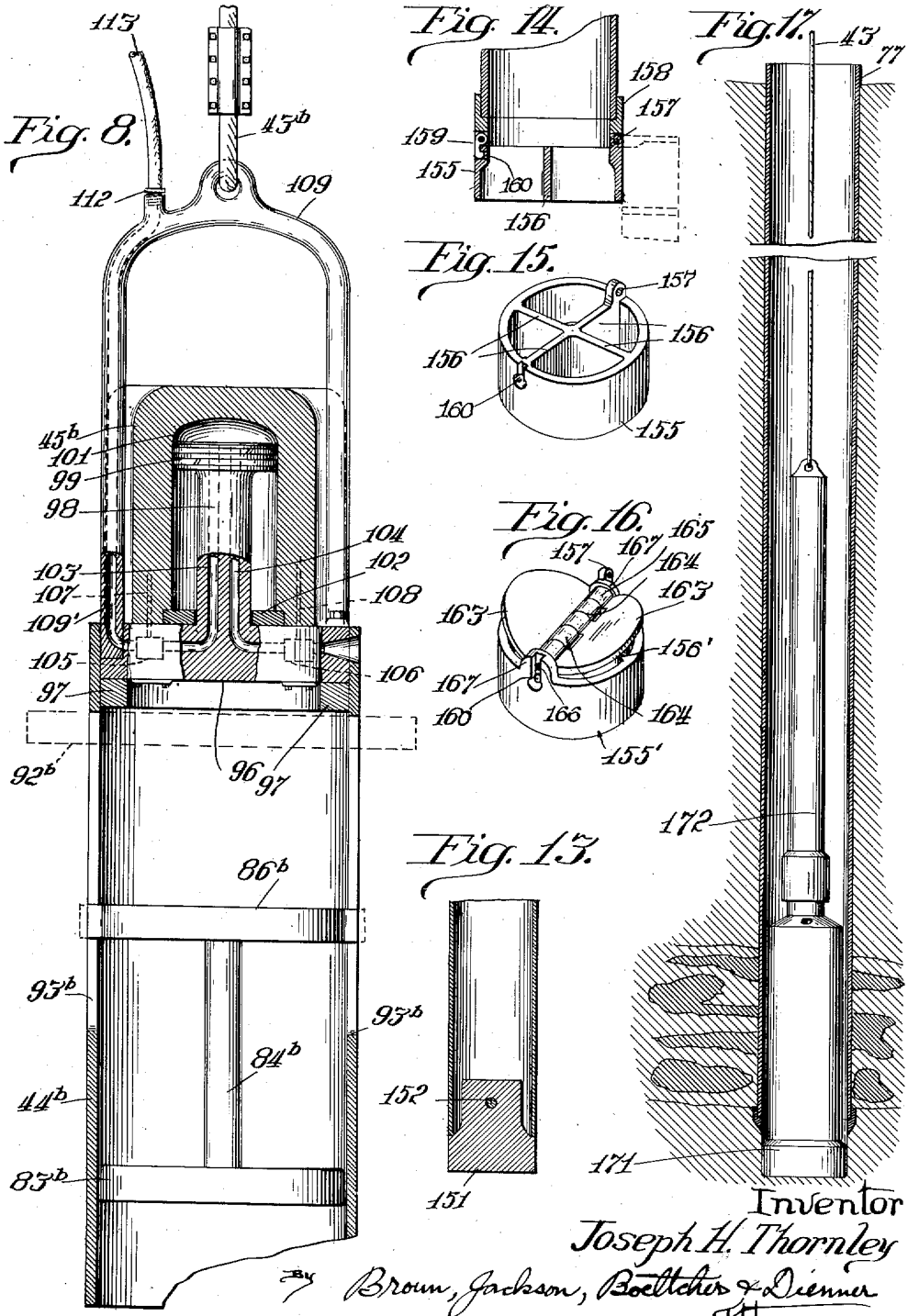
Inventor
Joseph H. Thornley
By Brown, Jackson, Boettcher & Dienner
Attorneys.

MECHANICAL DIGGING APPARATUS

Original Filed Nov. 13, 1929 4 Sheets-Sheet 4

Inventor
Joseph H. Thornley
By Brown, Jackson, Boettcher & Dienner
Attorneys.

Reissued Aug. 21, 1934

Re. 19,284

UNITED STATES PATENT OFFICE 19,284

MECHANICAL DIGGING APPARATUS

Joseph H. Thornley, Evanston, Ill.

Original No. 1,861,038, dated May 31, 1932, Serial No. 406,760, November 13, 1929. Application for reissue December 1, 1933, Serial No. 700,488

35 Claims. (Cl. 255—1)

The present invention relates to mechanical digging apparatus, and this application is a continuation in part of my co-pending application Serial No. 149,285 filed November 19, 1926.

The general object of the invention is to provide improved mechanical digging apparatus operating upon the principle of driving a cylindrical shell down into the ground with the lower end thereof open or adapted to receive the soil in the form of a slug, and then raising the shell to the surface of the ground and dumping the slug of soil therefrom.

The principal utility of the invention resides in sinking relatively deep holes for receiving concrete for caissons or piles of various descriptions, such as precast or cast-in-place concrete piles, or metallic, wood or concrete piles. However, the invention is also applicable to well drilling operations, the method broadly stated above permitting of the rapid sinking of a hole in soils which can be handled in this manner. The method can be practiced in a wide variety of soil conditions including relatively hard soil, clay, etc., and by the use of special attachments to be hereinafter described, it can be practiced in sand, gravel, stony soil and conditions of considerable subsurface water.

In these deep digging operations, the digging unit includes a hammer which goes down into the ground with the shell, this hammer being raised and dropped or vibrated vertically to drive the shell down into the ground. In this regard, it is a further object of the invention to provide an improved construction of digging unit embodying this hammer. In one form of the device the hammer is alternately raised and dropped through the hoisting and slacking of a cable line extending down to the unit, and it is one of the specific objects of the invention to provide a construction wherein a single cable can perform the twofold function of reciprocating the hammer and also raising and lowering the entire unit and expelling the slug of soil therefrom. In another form of the device the unit includes a power cylinder which is lowered into the hole with the digging shell, this power cylinder vibrating the hammer under the action of steam or compressed air.

Another object of the invention is to provide digging apparatus of the above general description with improved means for expelling the soil from the digging shell.

This is performed by a core or piston member disposed within the shell and so arranged that when the digging unit is raised above the ground relative telescopic movement can be readily effected between the shell and the core for forcing the slug of soil from the shell. Such improved means includes certain improved mechanism mounted on the derrick or tower of the power apparatus disposed above ground, whereby the shell member or the core member can be held stationary and the other member moved relatively thereto for discharging the soil from the shell. The present digging unit can be readily employed with an ordinary pile driver serving as the above-ground power apparatus for raising and lowering the shell, operating the hammer thereof, etc., such being of particular advantage in connection with foundation work in that no separate power apparatus, in addition to the ordinary pile driver, is required for performing the digging operations.

Certain features of the invention pertaining to the mechanism for expelling the soil from the shell and for discharging the soil into a vehicle or upon a dumping pile have particular association with the leads of the pile driver tower, but it will be understood that such mechanism can also be associated with any other form of derrick or tower. While the invention is probably of greatest advantage in relatively deep digging operations wherein the hammer is lowered into the ground as a part of the digging unit, nevertheless the invention can be utilized for relatively shallow digging where the ordinary hammer of the pile driver can deliver its blows directly to the digging unit or through a follower member interposed between said hammer and the digging unit. In such embodiment, the above described novel mechanism for expelling the slugs of soil from the shell is utilized in substantially the same relation as in the case of deep digging operations.

Another object of the invention is to provide improved means adapted to be disposed at the lower end of the digging shell for retaining sandy, loose or wet soils in the shell for hoisting to ground level. These devices can be employed in shells of relatively large diameter, where the cohesion of the soil is not sufficient to retain the entire slug in the shell. The present digging unit can be constructed in different sizes for digging holes ranging anywhere from 6 inches to several feet in diameter.

Various other objects and advantages of the invention will be apparent from the following description of a preferred manner of carrying the same into effect. In the drawings accompanying this description:

Figure 1 is a fragmentary view illustrating the operation, showing the pile driver and the digging unit operating in the ground.

Figure 2 is a vertical sectional view through one embodiment of the improved digging unit.

Figure 3 is a similar sectional view of another embodiment.

Figure 8 is a vertical sectional view of another embodiment employing a power operated hammer as a contained part of the digging unit.

Figure 13 is a fragmentary sectional view showing the use of a plug in the lower end of the shell.

Figure 14 is a sectional view through the lower portion of the digging shell showing the use of a retaining member which may be used under loose or wet soil conditions.

Figure 15 is a perspective view of one form of this soil retaining attachment member.

Figure 16 is a perspective view of an addition to this attachment comprising valve means for retaining very wet materials in the digging shell, and Figure 17 shows the next related step of drilling through hard strata such as rock or hard-pan.

Figure 4:
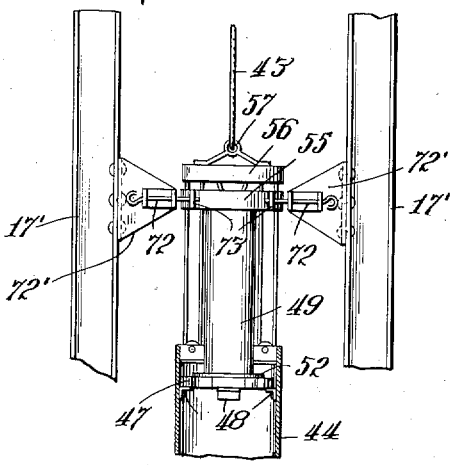
Figure 4 is a fragmentary front elevational view of the guide leads of the pile driver tower, showing the mechanism mounted thereon for retaining one of the members of the digging unit stationary in the operation of dumping the slug of soil.

When only a single hole or well is to be sunk the tower or derrick and the power apparatus may be erected in stationary relation at the site, but where a large number of holes are to be sunk, as in foundation pile work, it is desirable to employ a movable tower and power apparatus, such as a pile driver and accordingly I shall describe the invention as being used with such pile driver. The above mentioned co-pending application, of which this is a division, discloses an improved method of constructing foundations for buildings, bridges and the like, and in such application I have also described how this pile driver can be utilized in the operations of drilling through solid rock, lowering the casing sections and placing the structural steel columns of the foundation piles.

Referring to Figure 1, it will be seen that the portable pile driver or derrick rig comprises an upper platform 25 on which is erected the tower 26, the power plant 27 and the hoisting drum and other operating parts 28. This platform has a turntable mounting on a lower frame or bed 32 which in turn has roller support on two parallel rails 33, such rails constituting an attached part of the movable unit. The entire unit is supported on heavy timbers 34 laid on the ground at spaced points, such timbers serving as skidways on which the two rails 33, 33 can be slid either laterally or longitudinally. One of the longitudinal adjusting movements of the machine is obtained by arranging the bed or frame 32 to roll lengthwise of the rails 33 on sets of rollers, disposed at each end of the frame and bearing on the upper flanges of the rails. The rails 33 can be moved endwise or crosswise on the timbers 34 through the operation of suitable tackle rigging, all as described in my co-pending application. The turntable mounting of the platform 25 on the bed 32 may be of any suitable construction, such being shown as comprising a series of rollers 35 tracking between upper and lower circular rails secured respectively to the platform and to the frame, and the platform and bed frame being held together by a central king bolt 36. Thus the tower 26 can be readily revolved away from the hole, which may be of considerable advantage in dumping the slugs of soil from the digging shell. The digging unit, generally indicated at 42, is preferably operated by a single cable line 43 extending up over a sheave block in the top of the tower 26.

Referring now to the form of digging unit illustrated in Figure 2, it will be seen that it comprises a cylindrical shell 44 the lower end of which is driven into the soil by the impacting blows of a drop hammer 45 contained within the unit itself. When the unit is operating at the bottom of the hole, up and down movement of the cable line 43 through a limited stroke is operative to raise and drop the hammer. Such up and down movement of the cable line may be effected through a walking beam mounted on the derrick rig, or it may be effected through slip clutch mechanism cooperating with the hoisting drum 28, the latter practice being illustrated.

The hammer is raised and dropped through a pair of cables 46—46 coacting with the single cable line 43 (although, if desired, the line 43 might be connected directly to the hammer 45), and the blows of the hammer on its down strokes are transmitted to the shell through impact means comprising a relatively heavy disk-like plate 47 which reposes within the shell and engages on ledges or shoulders formed by heavy brackets or lugs 48—48 which are secured at different angular points around the interior of the shell. The plate 47 also serves as the head of a ram or core which is adapted to have relative telescopic movement within the shell 44 for expelling the contained slug of soil from the lower end of the shell when the digging unit is hoisted up into the tower for its dumping operation.

A cylindrical sleeve 49, of smaller diameter than the digging shell, is secured to the head 47 and serves as a stem for this core or ram, and also as a cylindrical guide within which the hammer 45 is reciprocated. The lower end of the sleeve 49 is secured to the plate 47 in any suitable manner, as by flanging the lower end of the sleeve outwardly and bolting this flange to the plate as indicated at 52. The hammer strikes the plate 47 directly, this plate being of relatively heavy construction to withstand these blows. The upper end of the sleeve 49 is secured to the outer side of a downwardly extending tubular neck portion 53, the lower end of which is flanged inwardly as indicated at 54 to form a limiting stop for limiting the upward movement of the hammer within the sleeve 49. The attaching portion 53 is secured to or forms a part of a transversely extending member 55, similar to a cross yoke or bar. Operating above this cross yoke 55 is a second cross yoke 56, to which is attached the line 43 through any suitable bracket or eye 57.

Figure 5:
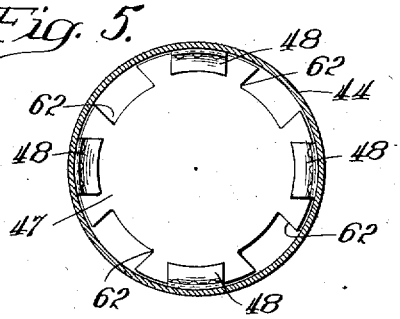
Figure 5 is a transverse sectional view through one of the digging units of Figures 2 and 3, taken, for example, on the plane of the line 5—5 of Figure 2.
Figure 6:
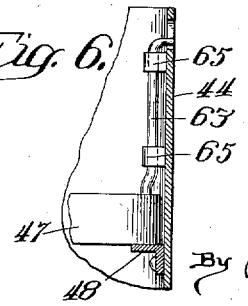
Figure 6 is a detail sectional view, illustrating the releasable locking means employed for holding the digging shell and the slug expelling core against relative rotation.

Secured within the upper end of the digging shell is an annular member 58, the central portion of which is formed as a relatively long tubular guide within which is guided the sleeve 49 of the dirt expelling core. A horizontal flange 59 extends outwardly from the lower end of this tubular guide portion, and an upwardly turned flange 61 extends around the perimeter of the bottom wall 59 and is riveted to the sides of the digging shell 44. The bottom wall 59 forms an upper stop against which the core head 47 engages when lifting the digging unit out of the well. Referring to Figure 5, it will be seen that the circumference of the core head 47 is formed with a spaced series of notches 62, corresponding in number and size to the driving lugs or brackets 43. In one angular position of the digging shell 44 the solid portion of the core head 47 will engage with the lugs or shoulders 48, at which time the down strokes of the hammer 45 will be transmitted to the shell through these lugs. By rotating the shell to bring the lugs into registry with the notches 62 the digging shell and core can have relative telescopic movement whereby the core head will operate to expel the contained slug of soil from the lower end of the digging shell, such operation occurring when the unit is in its elevated dumping position between the leads of the tower. In order to maintain the notches 62 out of registry with the lugs 48 when the shell is being driven into the ground, a releasable locking pin 63 is mounted in the upper part of the shell for reception at its lower end in a socket or hole in the top of the plate 47, see Figure 6. This locking pin is guided for vertical movement in brackets 65 carried on the inner side of the shell, and by lifting this pin the lugs 48 may be revolved into registry with the notches 62 for a discharging operation of the core.

Mounted in the upper end of the digging shell, in brackets 66 bolted to the bottom wall 59 of the member 58, are pulleys 67 around which pass the cables 46. The outer ends of these cables are anchored at their upper ends to the cross yoke 56 by any suitable attaching means 68. After passing down around the pulleys 67, the cables are extended up over pulleys 69 which are pivoted to the upper cross yoke 56. This yoke may be of inverted channel formation with the pulleys 69 pivotally supported between the side flanges of such channel. From these pulleys the cables pass down through a central opening in the lower cross yoke 55 and into the core sleeve 49 where they connect to an eye 71 bolted to the upper end of the hammer 45. While I have referred to two cables 46—46, these cables may be sections of a single cable having its intermediate portion passed through the eye 71 or through a sheave connected to this eye.

In the construction shown, the two lower pulleys or sheaves 67 are placed at diametrically opposite points relative to the circular form of the digging shell and similarly the two upper pulleys 69 are also placed diametrically opposite for exerting hoisting power on the shell at two diametrically opposite points, but it will be obvious that three or more lower pulleys 67 and a corresponding number of upper pulleys 69 may be grouped at different points relative to the circular form of the digging shell for receiving a corresponding number of cable sections, so as to apply the lifting effort to the digging shell at three or more distributed points.

After the digging and drilling machine has been located with the tower leads 17′ over the desired spot the digging unit is started into the soil by making a shallow excavation therein, and thereafter by raising and slacking the cable line 43 the hammer 45 is caused to reciprocate for driving the shell 44 down into the ground. This driving action will occur owing to the fact that the combined weight of the shell 44 and core 47—49 is greater than the weight of the hammer 45. In consequence of this, the upward hoisting movement of the cross yoke 56 will, through the cables 46, transmit a hoisting movement to the hammer 45, the shell 44 remaining in its lower position in contact with the ground.

Upon quickly slacking the cable line the upper cross yoke 56 will be dropped, and with it the hammer 45, the lower end of the latter striking the impact plate 47 which delivers the hammer blow to the digging shell 44. As the shell descends into the ground the cable 43 must of course be gradually paid out to properly regulate the stroke of the hammer 45. This stroke is proportioned so that the upper end of the hammer will never strike the upper limiting stop 54 on the up stroke, but on the down stroke the full dropping inertia of the hammer will be effective on the plate 47. After the shell has been driven down into the soil to a depth where substantially the entire interior of the shell is filled by a slug of soil, the cable line 43 is wound up on the hoisting drum 28 for hoisting the digging unit up into the tower leads. Owing to the densely packed condition of the slug of soil within the shell and the frictional contact of this slug with the side walls of the shell, practically the entire slug will be raised with the digging unit. In the hoisting of the cable 43 the hammer 45 of course first moves upwardly into engagement with the upper limiting stop 54, and thereafter the cables 46 establish a direct hoisting connection between the upper cross yoke 56 and the shell 44.

The digging unit is hoisted up to a considerable height in the tower leads, to a point where the lower cross yoke 55 is brought into alignment with two latching bolts 72 mounted on plates 72′ secured to the side surfaces of the tower leads, see Figure 4. With the cross yoke in proper position the bolts are thrust inwardly by the lead man to engage in eyes or keepers 73 carried on the side of the cross yoke 55. This rigidly locks the yoke against raising, lowering or swinging movements. The locking pin 63 is then raised to releasing position, which frees the shell 44 so that it can be rotated to bring the lugs 48 into registry with the notches 62, the locking bolts 72 operating to hold the yoke 55 and head 47 against rotation in this releasing movement of the shell. By now applying further hoisting movement to the cable 43 the shell 44 is pulled up over the core head 47 in an upward telescopic movement, this naturally following owing to the fact that the cross yoke and core are held against vertical movement by the bolts 72 and hence the tension acting on the cables 46 must pull the shell up over the core. Preliminary to this last hoisting movement of the main cable lead, a chute 74 is swung out of the tower through the open front space between the leads 17′.

It will be observed from Figure 1 that this chute is pivotally supported at its upper end within the tower on a pivot shaft 75, so arranged that the chute in its normal vertical position will not interfere with the movement of tools, casing etc. between the tower leads. By the operation of any suitable hoisting tackle or other operating means the chute is caused to swing forwardly and outwardly between the derrick leads so that it will extend at a sloping angle below the lower end of the digging unit. Thus the slug of soil expelled from the digging unit will drop into the chute and be deflected forwardly into a truck at the front end of the machine. The swinging turntable movement of the machine also enables the tower to be swung to any angle for dumping into a truck to either side of the machine.

After the dumping operation has been completed and the chute returned to its normal position slack is gradually paid out to the cable 43 with the result that the shell 44 descends down over the core head 47 to bring the latter into its normal position against the stop shoulder 59. This descending movement of the shell will naturally follow as the cable line 43 is paid out owing to the fact that the shell 44 is heavier than the hammer 45.

After the head 47 engages the stop shoulder 59 the shell is revolved to bring its lugs 48 under solid peripheral portions of the head 47, whereupon the locking pin 63 is dropped down to locking position to retain this angular relation between the core and shell. Thereafter the bolts 72 are released and the digging unit is again lowered into the hole for a continuation of the previously described digging operation.

Figure 3 illustrates a modified form of digging unit of the same general construction as the one just described. In this modified form, however, the pulleys 69 are mounted on the lower cross yoke 55 instead of on the upper cross yoke 56. The hammer is reciprocated by alternately hoisting and dropping the cable 43, and the lower cross yoke is held in the tower leads by the bolts 72 during the dumping operation, substantially as described of the preceding embodiment. It will be observed that in these two embodiments all of the operations are performed by a single cable line 43, and such construction is preferable. However, it is also within the purview of the invention to employ two cables, one for reciprocating the hammer and one for raising and lowering the shell.

As the digging of the hole progresses, it is desirable to "case-in" the hole by sections of casing 77, this casing being of larger diameter than the digging unit 42 to permit the latter to pass therethrough. The provision of the tower and tower leads 17′ is of particular advantage for performing this casing-in operation, as the casing sections can be supported and accurately guided between the tower leads as the casing is being extended down into the hole. It is preferable that the lower end of the casing follow the descent of the digging unit 42 quite closely so that the digging shell in its gradual descent will always be within the guiding confines of the casing. Any excess sub-surface water accumulating in the bottom of the hole during the aforesaid digging operation can be bailed out by a standard bailer, such as is used in well drilling practice, or can be exhausted by a sand pump, as is well known in the art. The presence of the casing 77 will in most instances case off the hole against excess water.

Figure 7:
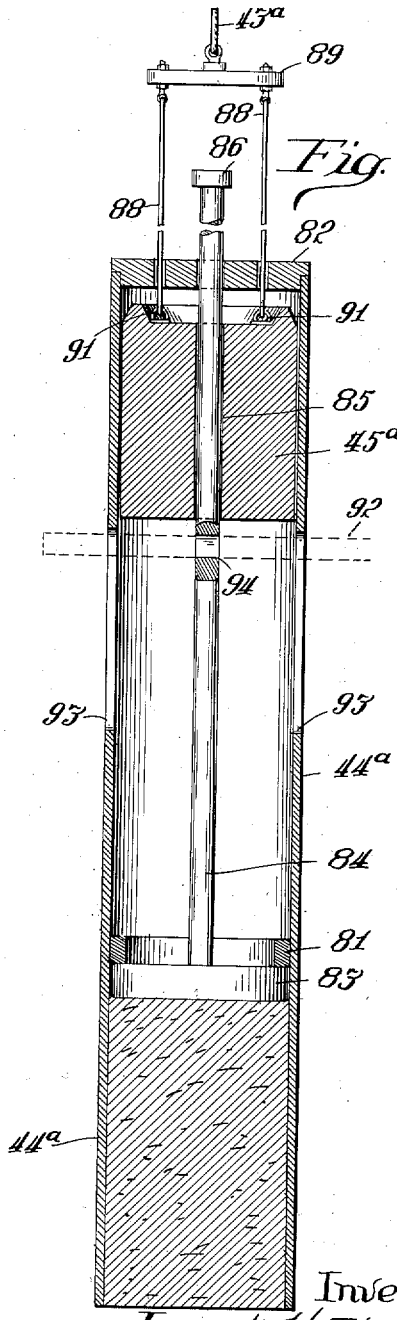
Figure 7 is a vertical sectional view of another embodiment employing a cable actuated hammer.

Figure 7 illustrates a modified construction comprising the digging shell 44*a* and the hammer 45*a* which is raised and dropped within the shell for driving the latter. On the down stroke the hammer strikes a ring 81 mounted internally within the shell 44*a*, thereby transmitting its driving blow to the shell. After the shell has received its slug of soil, filling the entire lower portion thereof, the hammer is pulled up against a stop member 82 in the form of a ring or plate which is secured within the upper end of the shell 44*a*. Thereupon a continued hoisting movement transmitted through the cable 43*a* raises the entire shell and hammer up out of the ground for the dumping operation. The discharge of the slug of soil is effected by an ejecting member comprising a piston 83 which is disposed in the lower portion of the shell below the driving ring 81. A rod 84 extends upwardly from this piston and passes through a central guide passageway 85 in the hammer 45*a*, the upper end of said piston rod 84 having a stop shoulder 86 thereon adapted to engage either with the top of the hammer 45*a* or with the top of the upper stop member 82 for preventing the ejecting piston 83 from dropping out of the bottom of the shell. The length of the piston rod 84 up to the stop shoulder 86 is sufficient to permit the piston member to assume a position adjacent to the lower cutting edge of the shell when the hammer 45*a* is engaging against the lower stop ring 81, such corresponding to the relative position of the parts when the shell is just starting a new digging operation and when the hammer has been dropped to transmit a driving blow thereto. As the shell is driven into the ground and the slug of soil moves upwardly in the shell relatively to the downward movement of the shell, the piston member 83 is forced upwardly by the soil and hence its upper stop shoulder 86 rises relatively to the shell. To provide working clearance for the relative rising and falling movement of this upper stop shoulder 86 the actuating cable 43*a* is operatively connected to the hammer 45*a* through two or more cables 88 which are spaced from the piston rod 84. The upper ends of the latter cables are connected to a cross bar or distributor member 89, to which the main actuating cable 43*a* is attached, and the lower ends of the cables 88 are connected to the hammer at 91. The cables 88 are of sufficient length so that the full range of upward movement of the rod 84 relatively to the shell is permitted without said rod striking the cross bar 89, even when the hammer 45*a* is in its lower position against the driving ring 81.

As the shell 44*a* is driven down into the soil, additional lengths of the actuating cable 43*a* are paid out progressively from the slip clutch drum so that the hammer 45*a* will have its proper motion in the shell and will not strike the upper stop 82. With the continued descent of the shell the slug of soil therein gradually moves the free piston 83 upwardly relatively to the shell until such piston moves into proximity to or contact with the lower stop shoulder 81. Thereupon the digging unit is raised up into the tower leads for the dumping operation. This is performed by holding the free piston 83 in stationary relation in the tower leads and pulling the shell 44*a* upwardly relatively thereto for forcing the slug of soil out of the bottom of the shell.

The piston is held stationary by passing a transverse bar 92 through diametrically opposite slots 93 in the shell and temporarily securing the ends of this cross bar to the leads of the tower. The bar 92 may be extended through a hole 94 in the piston rod 84, or may have its under side engage shoulders on the piston rod whereby the latter is held against upward movement, corresponding substantially to the manner in which the ejecting member 47 of the two preceding embodiments is held against upward movement. Thereupon the shell 44*a* is hoisted through the cable 43*a*, with the result that the slug of soil is pushed out from the lower end of the shell. The slots 93 are of the required length to permit the piston 83 to effect a complete discharge of the soil. The removal of the transverse stop bar 92 frees the piston so that it lowers with the shell in starting the next digging operation.

Figure 8 illustrates a modified embodiment wherein the hammer which is lowered as a part of the digging unit is power operated through the medium of steam or compressed air supplied through a hose extending down to the digging unit. Mounted in the upper portion of the digging shell 44*b* is a heavy plate member 96 which serves as the driving base of the hammer 45*b*. The base member 96 engages against an internal ring 97 or may be otherwise secured in the shell to transmit the force of the driving blows thereto. Rising from the center of this base member is a standard 98 carrying a piston 99 at its upper end. This piston operates in a cylinder 101 formed in the hammer 45*b*, the latter being constructed in the form of an inverted cup-shaped member reciprocably supported over the piston 99. If desired, a guide ring 102 may be releasably secured in the lower end of the cylindrical bore 101 for establishing guiding engagement on the standard 98. The working fluid, which may be either steam or compressed air, is admitted to and exhausted from the cylindrical area 101 above the piston 99 through inlet and outlet passageways 103 and 104 respectively and which extend up through the standard 98 and open into the cylinder area through the top of the piston 98. The lower end of the passageways 103 and 104 extend laterally through the base member 96 and communicate with valve devices 105 and 106 respectively whereby the admission and exhaust through these passageways is controlled. Such valve devices are actuated by rods 107 and 108 respectively and which have a suitable operative engagement with the hammer member 45*b* whereby as the hammer member approaches the upper limit of its stroke the inlet valve 105 is closed and the outlet valve 106 is opened, and whereby at the bottom of the stroke the inlet valve is opened and the outlet valve is closed. The specific operating connections by which these valves are thus actuated need not be described as in and of themselves they do not constitute a part of the present invention and are generally understood by those skilled in the art from other analogous power hammer applications. Moreover, while I regard the general type of power hammer shown as being one preferred embodiment, it will be understood that numerous other types of hammers may be employed instead.

The hoisting cable 43*b* may be operatively connected with the shell 44*b* in any suitable manner, such as by extending the shell up above the top of the hammer 45*b* and connecting the cable to this upper portion of the shell. In the preferred construction shown, a bail member 109 is utilized to connect the cable with the digging shell, this bail member also serving to guide the reciprocatory movement of the hammer 45*b*, and to conduct the working fluid to the inlet valve 105. The lower ends of the two bail arms, are rigidly secured either to the base member 96 or to the shell 44*b*. The upper cross bar portion is spaced sufficiently above the hammer member to permit the full reciprocating stroke of the latter, and the cable 43*b* is connected to this cross bar portion. The vertical arm portions of said bail are disposed in vertical guide openings 111 formed in the hammer 45*b*, whereby the bail affords additional guiding means for the hammer. One of these bail arms may be hollow, as indicated at 109', with the lower portion thereof connected with the admission side of the inlet valve 105 for supplying the working fluid thereto. The upper end of this hollow bail arm connects through a nipple 112 with a hose or other flexible conduit 113 which conveys the working fluid down to the digging unit.

It will be seen from the foregoing that as long as the working fluid is supplied through the conduit 113 the hammer 45*b* will rise and fall under the automatic action of the valves 105, 106, the hammer, in each downstroke, striking at its lower end against an impacting surface on the base plate 96 and thereby transmitting driving blows down through the shell 44*b*. The valve apparatus is so timed that the hammer will not rise sufficiently far to create any upward impulse on the shell either by the guide ring 102 striking the bottom of the piston 99 or by the hammer striking the upper cross bar portion of the bail 109. The exhaust fluid passing down through the passageway 104 and outlet valve 106 can be discharged directly out through the side of the shell 44*b*.

After the shell has been driven sufficiently to have received the desired slug of soil therein, the entire unit is raised to ground level through a hoisting effort applied to the cable 43*b*, during which the flexible conduit 113 may be wound on a reel or otherwise elevated with the digging unit.

The ejection of the slug of soil is effected through a free piston 83*b* which, in the digging operation, is raised by the slug of soil up into the upper portion of the shell, substantially as described of the construction shown in Figure 7. The piston ejecting member comprises an upwardly extending rod 84*b* carrying a cross bar or head 86*b* at its upper end. This upper member has portions which extend into, or outwardly beyond, the two diametrically opposite slots 93*b* formed in the shell, such preventing the ejecting piston from dropping down entirely out of the shell after the slug of soil has been released therefrom. After the digging unit has been hoisted into the leads of the tower 26 a stop bar, similar to the bar 92 of Figure 7, is inserted transversely through the slots 93*b* above the head member 86*b* of the ejecting piston; or a suitable member comprising a pair of shoulders is arranged to engage the outwardly projecting ends of this head member 86*b*. Thereupon, with the piston 83*b* held against upward movement, the hoisting of the shell relatively thereto will eject the slug of soil.

In the embodiment above described the power hammer is of the single acting type wherein the driving impulse is obtained by the dropping of the hammer after having been raised by power, but it will be understood that the hammer may be of the double-acting type wherein power is also applied to the down stroke thereof.

Figure 9:
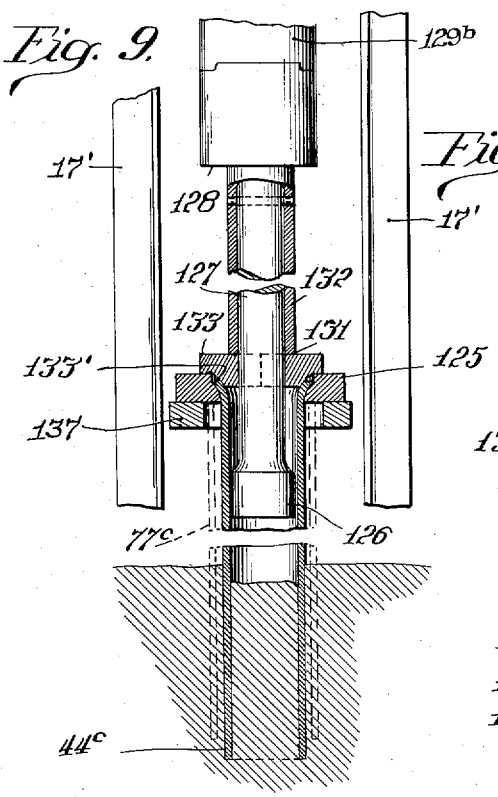
Figures 9 and 10 are vertical sectional views of another form of the invention, in the operations of digging and soil ejecting.
Figure 10:
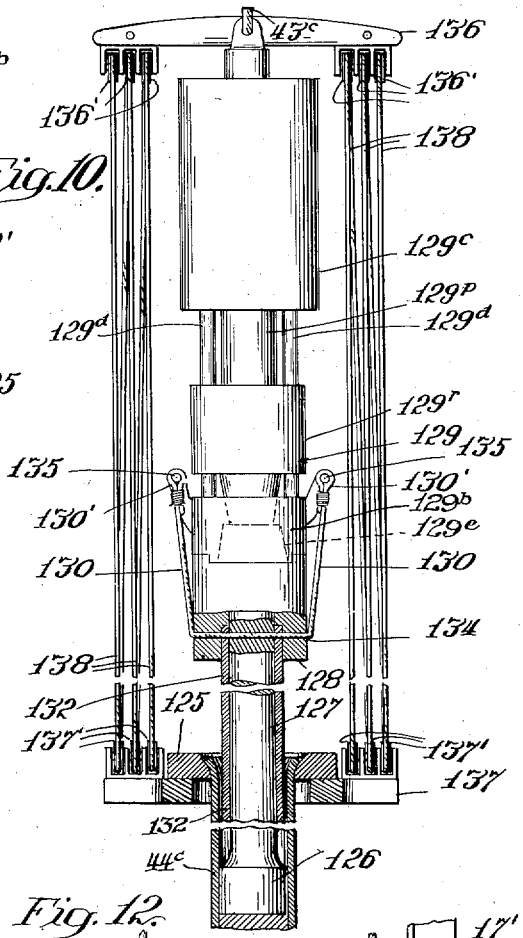

It will be noted that in each of the embodiments previously described the hammer element constitutes a part of the digging device whereby the earth receiving shell and the hammer are lowered down into the ground as a unit as the digging operation progresses. Such type of unit is particularly adapted for relatively deep operations, where the hole is cased off by progressively inserting sections of casing 77 (Figure 1) as the digging operation continues. However, there are certain fundamental features of my invention which may be practiced with a digging unit which is driven by blows received directly from the ordinary pile driver hammer, or through a follower member interposed between such hammer and the digging unit. Such form of device is adaptable to the shallower depths of operation, and wherein the hole may or may not be cased off, as desired. Figures 9 and 10 illustrate one of these modified embodiments, in the operations of digging and ejecting. The digging shell 44c is of plain cylindrical form having a hoisting collar 125 rigidly secured to its upper hand. Operating within this shell is a core 126, the lower end of which has a sufficiently accurate fit in the shell to guide the same and to eject the soil therefrom. This core may be of uniform diameter throughout its entire length, although preferably the shank portion thereof is of reduced diameter, as indicated at 127.

A head 128 on the upper end of this core is adapted to receive the driving blows of the pile driver hammer directly through the base portion of the hammer, or a follower member may be interposed between the hammer and the head 128. The hammer unit is designated 129 in its entirety and, as will be presently described, the digging shell and core are preferably connected with this hammer unit so as to be guided thereby in the movement in the leads. The driving blows are transmitted from the core to the upper end of the digging shell through a shoulder 131 projecting from the shank portion of the core. This shoulder may be provided by forming or securing a collar to said shank portion, although in the preferred construction shown I extend a sleeve 132 up to the head 128 for directly transmitting the driving stresses to the shoulder 131. This sleeve can pass down into the upper end of the digging shell 44c. In the digging operation a removable key 133 is interposed between the driving shoulder 131 and the collar 125. This key may consist of a U-shaped member adapted to snugly embrace the core shank 127, although it preferably consists of a split ring, the two halves of which are releasably held in place on the upper end of the digging shell by tapered lower surfaces 133′ which fit within the tapered upper end of the collar 125. In the driving operation, the key 133 transmits driving blows to the shell 44c and retains the lower end 126 of the core in the upper portion of the shell. When the driving shoulder 131 of the core is raised relatively to the shell the two semi-circular sections of this driving ring 133 can be readily removed from the collar 125. If desired, a casing indicated in dotted lines at 77c may also be driven down with the shell, the upper end of such casing engaging the hoisting collar 125 and being driven thereby.

Referring now to the manner in which the digging and ejecting apparatus are connected to the hammer unit 129, (Figure 10) such hammer unit may be of any conventional construction ordinarily comprising the base 129b, the power cylinder 129c and the intermediate reciprocating ram or hammer proper 129r. The base member is generally connected to the cylinder member by columns 129d, generally four in number, rigidly keyed to both members, and also extending through and serving as guides for the ram or hammer. In the driving operation the base 129b rests on the head 128 but the driving blows are applied directly to a cushion block 129e on said head through a lower reduced extension on the ram, which moves downwardly through an opening in the base 129b and strikes the cushion block directly. The ram is connected to the usual piston in the cylinder 129c through a piston rod 129p.

The core and head structure 126—128 is detachably connected with the lower portion or base member 129b of the hammer unit by a length of cable 130 which is passed through a transverse hole 134 in the head structure and has loops 130′ which engage over hoooks 135 projecting from said base member. The digging shell has tackle connection with the upper portion or cylinder member 129c of the hammer unit through two cross yokes 136 and 137 which are connected together by lines of cable 138 reeved around multiple sheaves 136′ and 137′ mounted on the outer ends of the yokes 136 and 137 respectively.

The lower yoke 137 engages under the hoisting collar 125 on the digging shell, and the upper yoke is mounted on the cylinder 129c or any other portion of the hammer unit adjacent to the upper end thereof. It will thus be seen that the digging shell, core and hammer device are all connected together so that they move downwardly in the derrick leads as a unit as the driving blows of the ram or hammer are applied to the cushion block 130 on the core head 128, the hammer unit and the upper yoke 136 moving down with the core and the lower yoke 137 moving down with the digging shell as the latter is driven down through the driving key 133.

After the desired slug of soil has been received in the shell the entire assembly is hoisted into the upper portion of the derrick leads 17′ through pull on the cable 43c connected to the upper end of the hammer unit. The driving key 133 is then removed by slacking off on the cables 138 to permit the collar 125 to move downwardly slightly from the driving shoulder 131. The ejecting operation is then started by placing tension on the cables 138 which have multiple reeving over the sheaves 136′ and 137′ in an obvious manner, so that they exert a very large force tending to cause relative telescopic movement between the shell and core. With relatively soft soils or when the digging shell only contains a moderately short slug, enough pressure may be exerted through such tackle rigging to start and complete the ejecting operation.

However, with the firmer soils and longer slugs a greater force may be necessary, and such as readily supplied by the hammer unit. That is to say, the hammer unit is energized to reciprocate the hammer ram and impart driving blows upon the head of the core while tension is still exerted on the cables 138. Such driving blows break the static friction of the soil in the shell, and may be continued throughout the entire ejecting operation to assist the ejecting tension exerted through the cables. After the completion of the ejecting operation the cables 138 are paid out to lower the digging shell relatively to the core so that the driving key 133 can be replaced in operative position. Thereupon, the entire assembly can be lowered for continuing the digging operation in the same or another spot. Particular attention is directed to the fact that in the ejecting operation all of the tension exerted through the cables 138 is borne entirely within the movable assembly, i. e. the tension reacts against the upper and lower ends of the hammer unit, and none of this tension reacts against the tower leads so that no injury to the tower structure can result no matter what ejecting pressure is developed. This ejecting pressure may be considerable because with a tower structure of a height of one hundred feet a digging shell approximating fifty feet or more in length may be used, and the frictional adhesion of the soil in such a shell may be very large.

It will be understood that when a casing 77c is driven down into the ground with the shell, such casing will remain in its driven position when the shell is lifted out of the ground.

Figure 11:
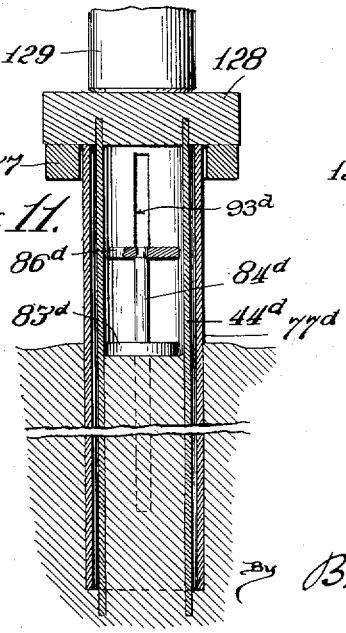
Figures 11 and 12 are similar sectional views of still another form of the invention, illustrating the operations of digging and of ejecting the soil from the shell.
Figure 12:
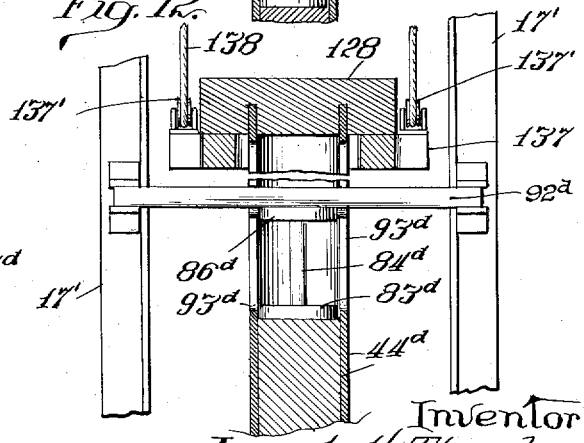

Figures 11 and 12 illustrate the digging and soil ejecting operations in another embodiment of my invention. In this form the ejecting operation is performed through a free piston carried in the digging shell, similarly to Figures 7 and 8. The shell 44d is rigidly secured at its upper end to a driving head 128. The ejecting piston 83d comprises the stem 84d and the upper cross bar 86d, the ends of which cross bar engage in two diametrically opposite slots 93d in the side walls of the shell.

The unit is driven down into the ground in substantially the same manner described of Figure 9. A casing 77d may also be driven down with the shell, the upper end of this casing bearing against the bottom of the driving head 128. As the shell is driven down the slug of soil rising therein pushes the ejecting piston 83d ahead of it up toward the upper portion of the shell. In this instance the hoisting yoke 137 engages with the under side of the driving head 128 and the cables 138 extend up to the upper yoke 136 which may be mounted on the hammer unit or on the tower structure. After the shell has been driven to the desired depth, a hoisting pull is exerted on these cables and the entire unit is pulled up into dumping position in the tower leads. A stop bar 92d is then inserted through the slots 93d to engage above the cross bar 86d of the piston, whereupon continued upward movement of the shell forces the slug of soil from the lower end thereof.

The ejecting piston is prevented from dropping out of the shell by the ends of the cross bar 86d striking the lower ends of the slots 93d.

In each of the embodiments illustrated in Figures 9 to 12 the digging shell may be of any desired length for sinking relatively deep holes, the length of the shell being limited only by the height of the tower or other apparatus which may be employed to dump the shell. The seating of the hammer base 129b against the upper driving head of the digging shell results in the digging shell receiving the guiding influence of the hammer unit in its guided movement in the derrick leads, and in Figures 9 and 10 the extension of the core head 126 down into the shell, in the digging operation, assists in maintaining this guiding influence. In each of the embodiments of Figures 9 to 12 the lower hoisting yoke 137 may be constructed in the form of a solid ring having outwardly extending yoke arms on which are mounted the cable sheaves, the ring being passed up over the lower end of the digging shell; or such ring portion may be constructed in two semi-circular sections which can be detachably bolted together over the shell. The yoke arms may extend in the plane of the derrick leads or at right angles thereto and may have any desired number of cable sheaves mounted thereon. The sinking of the hole may be effected by a single driving operation for filling the entire shell, or it may be effected by successive driving and dumping operations.

In the use of the apparatus soft soil conditions may be encountered which can be penetrated by a simple driving operation as readily as by digging. In such cases I propose placing a removable plug in the lower end of the digging shell, substantially as illustrated in Figure 13. This plug, designated 151, has a base portion substantially equal to or slightly larger in diameter than the digging shell, and has a reduced portion extending up into the shell. A transverse bolt or pin 152 passing through the shell and the reduced portion serves to hold the plug in position. As soon as soil conditions are encountered which make the digging operation more expedient the shell is raised to ground level and the plug 151 removed.

When operating in dry pulverized soil or in wet slippery material the soil may not have sufficient adhesion in its own mass or with the side walls of the shell to prevent portions of the slug from dropping out of the shell when the latter is raised to dumping position. Figure 14–16 illustrate a soil retaining member which may be inserted in the lower end of the shell for operating under these conditions. This device is in the form of a ring 155 having one or more ribs or walls 156 extending transversely of the ring.

In the driving operation the soil is forced up through the voids between the transverse walls 156. When the shell is raised the ring functions to retain the soil therein by increasing the area of frictional contact of the lower end of the slug with the shell, by breaking up the span of the lower end of the slug and by the upper edges of the ring and of the walls functioning as supporting surfaces for the soil. The ejecting operation may be performed by forcing the soil down through the voids of the ring, or such ring may be removed completely or merely swung out of the the way for an unobstructed ejection. For example, the ring may be releasably secured to the shell by having a portion thereof engage outside or inside the shell and by passing a suitable pin or bolt transversely through oppositely aligned holes in such portion and the shell. The removal of said pin or bolt will then permit the ring to be entirely removed in the ejecting operation. As illustrative of another construction permitting the ring to be merely swung down out of the way in an ejecting operation, the upper portion of such ring may have pivotal mounting on one side at 157 on a mounting ring 158 which is either permanently or temporarily secured to the lower end of the driving shell (Figure 14). At the opposite side of such mounting ring is suitably pivoted a latch hook or like device 159 which can be swung out of a locking recess 160 in the ring 155, thereby permitting said soil retaining ring to be swung back to the dotted line position shown in Figure 14 for a soil ejecting operation.

For digging in very wet materials a removable valve device may be mounted in the lower end of the shell. Such device is illustrated in Figure 16 and may comprise the same general form of ring 155′ having the transverse walls 156′ as above described. One or more flap valves 163 are movably supported on the ring, for opening under the upward pressure of the soil and closing under downward pressure thereof. In the preferred construction shown, two of such valve members are employed, both being of semi-circular shape and having matching hinge bosses 164 and 165 at their inner edges. A pivot pin 166 extends through bearing supports 167 on the ring 161 and through the aligned hinge bosses 164, 165 of the two valve members. The valves can swing upward freely under the pressure of the soil, but in their downward movements they seat on the upper edge of the ring 155′ and prevent egress of the material from the shell. The device may be removably bolted or hinged at the bottom of the shell substantially as described of Figures 14 and 15. The seating of the flap valves will retain substantially all of the contained slug of wet material as the shell is being raised, and where the material is sufficiently liquid the ejecting thereof may be accomplished by forcing the valves upwardly to open position without removing or swinging the ring 155′ downwardly from the shell.

Each of the attachment devices illustrated in Figures 13, 14, 15 and 16 can be used with any of the embodiments of digging apparatus illustrated in the Figures 1 to 12 inclusive.

It will be seen from the foregoing that this operation of mechanically digging a hole by driving a shell down into the ground to force a slug or quantity of soil into the shell and then raising the shell and dumping the same, can be expeditiously performed under practically all soil conditions which can be penetrated in this manner, the attachments illustrated in Figures 15 and 16 accommodating the operation to conditions of a dry pulverized material or a very wet material. In most soils mechanical digging can generally be performed more rapidly than a drilling operation. However, when stony and other hard strata are encountered the operation of the digging unit is discontinued and a drilling bit is employed to continue the operation down through these harder strata. This drilling operation may be performed either by a rotary bit or by a reciprocating bit, the latter practice being preferable, however, in view of the fact that the mechanism embodied in the digging and drilling machine for raising and lowering the cable of the digging unit is also admirably suited to the operation of a reciprocating bit. In Figure 17, illustrating this next drilling step, I have accordingly shown a reciprocating bit 171 connected to a stem 172 which in turn is hitched to the cable line 43.

The bit is preferably of the same cutting diameter as the mechanical digging unit, and may be of any desired type.

These two steps of mechanically digging through the softer materials and drilling through the hard strata have cooperative relation in that they combine to provide a method by which the hole can be sunk more rapidly, and by which the spoils or waste material removed from the hole can be handled more expeditiously and to better advantage. The latter feature is of particular importance in excavating operations in congested localities where it is necessary that the waste material be removed from the site of operations. For example, although the entire hole might be sunk by a drilling operation through the use of a drilling bit as has been described, the difficulties incident to handling the spoils or waste material from such drilling operation makes the adoption of this latter operation objectionable for penetrating through the softer soils. That is to say, the removal of the drilled and churned-up material in a drilling operation is effected by the well known bailing method, which necessarily requires the presence of a large quantity of water for sweeping the material into the bailer at the bottom of the hole.

In constructing foundations for buildings and other structures in congested localities, it is necessary that the excavated material be transported away from the site in dumping trucks or wagons. It will be evident that great difficulties would arise in transporting in such manner the churned-up material excavated by the drilling operation, particularly when drilling through clays, etc. The dumping of a bailer of churned-up clay and water into a truck would result in the clay settling into a relatively solid mass which would be extremely difficult to discharge from the truck. It will furthermore be evident that the use of a settling basin on the site of a building structure would be impracticable. These difficulties are avoided by the present mechanical digging method, which removes the material in a comparatively dry state, in which condition it can be readily handled in a truck and discharged therefrom. The subsurface moisture of the soil will generally be sufficient to enable the soil to pack firmly in the digging shell for hoisting the soil therein in slug formation, but will not be present in the excavated material in quantities which would render difficult the handling of the material in the dumping trucks, etc. As above stated, the drilling bit will be used primarily for cutting through stones, boulders and down into bed rock, and the hard spoils materials resulting from these operations can be dumped from the bailer into the dumping truck without such materials tending to agglomerate into a solid mass in the truck.

By the present method a hole can be rapidly sunk to a considerable depth either in well sinking operations or for bonding structural steel foundation columns in bed rock, as described in my co-pending application above mentioned, and these holes can, if desired, be made of relatively small diameter, such as would not otherwise be possible where it is necessary to lower a man into the hole for performing the digging or drilling operation.

While I have shown what I consider to be the preferred manner of carrying out my invention I do not consider the invention limited to the details of this specific disclosure, but wish it to be understood that numerous departures and changes may be made or practiced within the broader aspects of the invention.

I claim:

1. A mechanical digging unit comprising a shell having an open lower end, driving means comprising a hammer reciprocable relative to said shell for driving the latter down into the soil, cable means arranged for raising and lowering said shell and said driving means as a unit, and an ejecting member movable longitudinally in said shell.

2. A mechanical digging unit comprising a shell having an open lower end adapted to be driven into the soil, hammer means for driving the shell, cable means for raising and lowering said shell, and for operating said hammer means, an ejecting member capable of movement in said shell, and power actuated means for causing relative longitudinal movement between said ejecting member and said shell for ejecting soil from the latter.

3. A mechanical digging device comprising a digging shell having an open lower end, a hammer for driving said shell, a cable for operating said digging device, means comprising block and tackle apparatus connecting said cable to said digging device whereby continued movement of said cable in one direction is operative to raise or lower said unit, and short stroke intermittent motion of said cable is operative to reciprocate said hammer relative to said shell, and cable operated ejecting means for ejecting the soil from said shell.

4. A digging device comprising a digging shell open at its lower end, hammer means for driving said shell, means for ejecting the soil from the shell and means operated through a single cable line for actuating said hammer means when digging, and for raising and lowering said shell between digging operations, and for causing said ejecting means to operate to eject the soil from said shell.

5. A digging device comprising a digging shell having an open lower end, a hammer for driving said shell, impact means adapted to be struck by said hammer on its down stroke and through which the driving blows are transmitted to said shell, and means permitting relative telescopic movement between said hammer and said shell for ejecting the contained slug of soil from said shell.

6. A self-contained digging unit comprising a digging shell open at its lower end, a hammer reciprocably guided adjacent the upper end of said shell, means preventing separation of said hammer from said shell upon the up stroke of said hammer, means for transmitting the down stroke blows of said hammer to said shell, said latter means being releasable to permit the discharge of the contained slug of soil from said shell, and cable means for reciprocating said hammer.

7. A self-contained digging unit comprising a digging shell having an open lower end, a hammer reciprocably guided adjacent the upper end of said shell, a core for expelling the earth from said shell, and means operable through a single cable line for actuating said hammer means when digging, for raising and lowering said shell, and for causing said core to expel the earth from said shell when the latter is raised to dumping position.

8. In combination, an above-ground digging rig comprising upwardly extending guide means, a self-contained digging unit adapted to be raised and lowered relative to said guide means on a cable line, said digging unit comprising two members having relative telescopic movement, one of said members having an open lower end adapted to be driven into the soil, hammer means in said digging unit for driving said latter member, and holding means associated with said guide means for securing one of said telescopic members in substantially fixed position when said digging unit is raised into said rig, whereby said members may be caused to telescope, one with respect to the other for discharging the soil from said unit.

9. In apparatus for sinking foundation wells, the combination of a mechanical digging unit adapted to be driven into the soil for raising slugs thereof to the surface of the ground, said digging unit comprising means for expelling the slugs of soil therefrom, an above ground digging rig for operating said mechanical digging unit, said digging rig comprising a derrick into which the digging unit is hoisted for dumping the slugs of soil therefrom, power operated means for effecting relative movement between said digging unit and said expelling means substantially vertically in said derrick and a chute movably supported relative to said derrick and adapted to be moved to an operative position below said digging unit for receiving the slug of soil expelled therefrom and directing it to a dumping point.

10. A digging device comprising a driving shell, hammer means for driving said shell, a free piston member in said shell for ejecting the soil therefrom, and cable means for moving said piston member in said shell.

11. A digging device comprising a digging shell adapted to receive soil through its lower end, a hammer guided for reciprocatory movement within the upper portion of said shell, a shoulder carried by said shell adapted to transmit the driving blows from said hammer to said shell, a cable, means directly connecting said cable with said hammer whereby the latter is lifted and dropped directly with hoisting and dropping movements of said cable, an ejecting piston disposed in said shell below said shoulder, a stem extending from said piston upwardly through said hammer, and means for cooperating with said stem adapted to hold the piston substantially stationary when said shell is drawn upwardly relatively thereto for ejecting the soil.

12. A self-contained digging unit comprising a digging shell adapted to receive soil through its lower end, a power hammer associated with said shell for driving the same, said shell and hammer being adapted to be lowered as a unit into the hole being dug thereby, means for supplying power to said power hammer, and an ejecting member movable longitudinally in said shell for ejecting a contained slug of soil therefrom.

13. A self-contained digging unit comprising a digging shell adapted to receive soil through its lower end, a power hammer comprising a piston member and a cooperating cylinder member, one of said members being secured to said shell and the other of said members being adapted to impart driving blows to said shell, valve means controlled by the relative reciprocatory movement between said members for governing the admission and exhaust of a working fluid to and from said cylinder member, a cable for raising and lowering said hammer and shell as a unit in the hole being dug, a flexible conduit for supplying the working fluid to said hammer, and an ejecting member separate from said power hammer and adapted to be power operated for ejecting the soil from said shell.

14. A digging device comprising a digging shell adapted to receive soil through its lower end, a core associated with said shell, and releasable key means adapted to lock said core and shell against relative telescopic movement so that the shell can be driven through said core, the releasing of said key means permitting relative telescopic movement between said core and said shell for ejecting the soil from the latter.

15. A digging device comprising a digging shell adapted to receive soil through its lower end, a driving head mounted on the upper end of said shell and adapted to receive the blows for driving the other end of said shell into the ground, an ejecting piston reciprocable in said shell, said shell having a longitudinal slot in the wall thereof, means for preventing said piston from dropping out of the lower end of said shell, and means cooperating with said piston through said slot for ejecting the slug of soil from the lower end of said shell.

16. A digging device comprising a digging shell adapted to receive soil through its lower end when said shell is driven downwardly into the ground, means for ejecting the slug of soil from said shell when the latter is raised to dumping position, and a closure plug adapted to be secured to the lower end of said shell for driving through soft soils or other ground conditions.

17. A digging device comprising a digging shell adapted to receive soil through its lower end when said shell is driven downwardly into the ground, a retaining member associated with the lower portion of said shell comprising transversely extending means for retaining the slug of soil in the shell as the latter is being lifted into dumping position, and an ejecting member movable longitudinally in said shell for ejecting said slug of soil.

18. A digging device comprising a digging shell adapted to receive soil through its lower end when said shell is driven downwardly into the ground, means for driving said shell, valve means associated with the lower end of said shell for retaining the soil therein as said shell is being lifted to dumping position, an ejecting member movable longitudinally in said shell, and power means for causing relative longitudinal movement between said ejecting member and said shell for ejecting the soil from the latter.

19. A digging device comprising a digging shell adapted to be driven endwise into the ground for receiving a quantity of soil therein, a hammer member carried by said digging device and movable relatively to said shell, an ejecting member operable within said shell for ejecting the soil therefrom, and means for causing relative endwise movement between said shell and said ejecting member for effecting an ejecting operation when said shell is raised to dumping position.

20. In combination, a derrick structure comprising a power operated hammer movable vertically therein, a digging shell adapted to be driven endwise into the ground for receiving a quantity of soil therein, and an ejecting member operable within said shell and adapted to have the driving blows of the hammer transmitted to said member for ejecting the soil from said shell when the latter has been raised to dumping position.

21. In combination, a pile driver derrick comprising vertically extending leads, a power operated hammer unit sliding vertically between said leads and comprising a piston reciprocated ram, a core member connected to said hammer unit and adapted to have the power driving blows of said ram transmitted thereto, a digging shell adapted to be driven endwise down into the ground for receiving a slug of soil therein, releasable driving means adapted to connect the lower portion of said core member with said digging shell for transmitting driving blows to the latter, the release of said driving means permitting relative telescopic movement between said core member and shell for ejecting the slug of soil from the shell, a lower hoisting member connected with said shell, an upper hoisting member connected with said hammer unit, and tackle rigging connected between both of said hoisting members and operable to cause relative endwise movement between said hammer unit and said shell whereby said core member is caused to eject the soil from said shell, said ram being operable to transmit driving blows to said core member to aid in the soil ejecting operation.

22. A digging device comprising a driving shell, hammer means comprising a cylinder and piston for driving said shell, and a free piston member in said shell for ejecting the soil therefrom.

23. A digging device comprising a driving shell, hammer means comprising a cylinder and piston for driving said shell, a free piston member in said shell for ejecting the soil therefrom, and cable means for moving said piston member in said shell.

24. In combination, a digging shell, means for raising and lowering the shell, means for driving the shell comprising a hammer reciprocable relatively to said shell, and ejecting means for the shell operable by said raising and lowering means.

25. In combination, a digging shell, a casing adapted to be moved down into the ground with the digging operation, said digging shell operating within said casing, means for raising and lowering said shell, means for driving the shell comprising a hammer reciprocable relatively to said shell, and ejecting means for the shell operable by said raising and lowering means.

26. In combination, a digging shell, means for driving the shell comprising a hammer reciprocable relatively to said shell, ejecting means for said shell, and a cable for operating said ejecting means.

27. In combination, a digging shell, a casing adapted to move down into the ground with the digging operation, said digging shell operating within said casing, means for driving the shell comprising a hammer reciprocable relatively to said shell, ejecting means for said shell, and a power operated cable for operating said ejecting means.

28. In combination, a digging shell adapted to receive soil through its lower end when said shell is driven downwardly into the ground, a casing adapted to move down into the ground with the digging operation, said digging shell operating within said casing, retaining means associated with the lower portion of said shell for retaining soil in the shell as the latter is being lifted into dumping position, and an ejecting member movable longitudinally in said shell for ejecting the soil therefrom.

29. In combination, a digging shell adapted to receive soil through its lower end when said shell is driven downwardly into the ground, a casing adapted to be sunk into the ground progressively with the digging operation, said digging shell being adapted to pass through the open lower end of said casing and to be driven down into the ground in advance of said casing, an attachment on the lower end of said shell capable of passing through the lower end of said casing and operating to retain the soil within said digging shell, said attachment being detachable for substitution by other cutting and soil retaining attachments appropriate to the material through which the shell is being driven, and an ejecting member movable longitudinally in said shell for ejecting the soil therefrom.

30. In combination, a casing having an open lower end adapted to be sunk into the ground, a digging shell adapted to be driven into the soil down through the lower end of said casing, means for driving said digging shell comprising a hammer reciprocable relatively to said shell, said shell comprising an upper extension portion and having an overall length longer than said casing whereby said shell is driven into the soil in advance of the lower end of said casing for receiving slugs of soil in said shell, means for causing said casing to be carried down with progressive sinking of said shell, said shell being lifted up through said casing to ground level for ejecting the slugs of soil therefrom, and a soil ejecting member movable longitudinally in said shell.

31. In combination, a casing having an open lower end adapted to be sunk into the ground, a digging shell adapted to be driven down into the soil through the lower end of said casing to receive slugs of soil through the lower end of said shell, means for driving said digging shell comprising a hammer reciprocable relatively to said shell, a driving head mounted on the upper end of said shell and adapted to receive the blows for driving the lower end of said shell into the ground, an ejecting piston reciprocable in said shell, means for preventing said piston from dropping out of the lower end of said shell, and means cooperating with said piston for ejecting the slugs of soil from the lower end of said shell.

32. A digging device comprising a digging shell adapted to receive soil through its lower end when said shell is driven downwardly into the ground, a retaining member associated with the lower portion of said shell for retaining the slug of soil in the shell as the latter is being lifted into dumping position, and means for ejecting the slug of soil from said shell under power when the shell is raised to dumping position.

33. A self-contained digging unit comprising a digging shell adapted to receive soil through its lower end when said shell is driven downwardly into the ground, a hammer associated with said shell for driving the same, said shell and hammer being adapted to be lowered as a unit into the hole being dug thereby, tackle means for raising and lowering said shell and means for causing said hammer to transmit driving blows to said shell, retaining means associated with the lower portion of said shell for retaining the slug of soil in said shell as the latter is being lifted into dumping position, and means for ejecting the slug of soil from said shell under power when the latter has been raised to dumping position.

34. A self-contained digging unit comprising a digging shell adapted to receive soil through its lower end when said shell is driven downwardly into the ground, a hammer associated with said shell for driving the same, said shell and hammer being adapted to be lowered as a unit into the hole being dug thereby, tackle means for raising and lowering said shell and for causing said hammer to transmit driving blows to said shell, a retaining member associated with the lower portion of said shell adapted to occupy a position tending to obstruct the discharge of the soil from said shell as the latter is being lifted into dumping position, means connecting said retaining member with said shell enabling said retaining member readily to be moved away from such obstructing position, and means for ejecting the slug of soil from said shell under power when the latter has been raised to dumping position.

35. A self-contained digging unit comprising a digging shell adapted to receive soil through its lower end, a power hammer associated with said shell for driving the same, said shell and hammer being adapted to be lowered as a unit into the hole being dug thereby, means for supplying power to said power hammer, and means for ejecting the slug of soil from said shell under power when the latter is raised to dumping position.

JOSEPH H. THORNLEY.